March 31, 1953 R. E. OHRN 2,633,063
GLUING MACHINE
Filed March 19, 1951 9 Sheets-Sheet 1

Inventor:
Rudolph E. Ohrn
By: EdWagonseller
Atty.

March 31, 1953 R. E. OHRN 2,633,063
GLUING MACHINE
Filed March 19, 1951 9 Sheets-Sheet 2

March 31, 1953  R. E. OHRN  2,633,063
GLUING MACHINE
Filed March 19, 1951  9 Sheets-Sheet 3

Inventor:
Rudolph E. Ohrn
By: EdWagonseller
Atty.

March 31, 1953 R. E. OHRN 2,633,063
GLUING MACHINE
Filed March 19, 1951 9 Sheets-Sheet 4
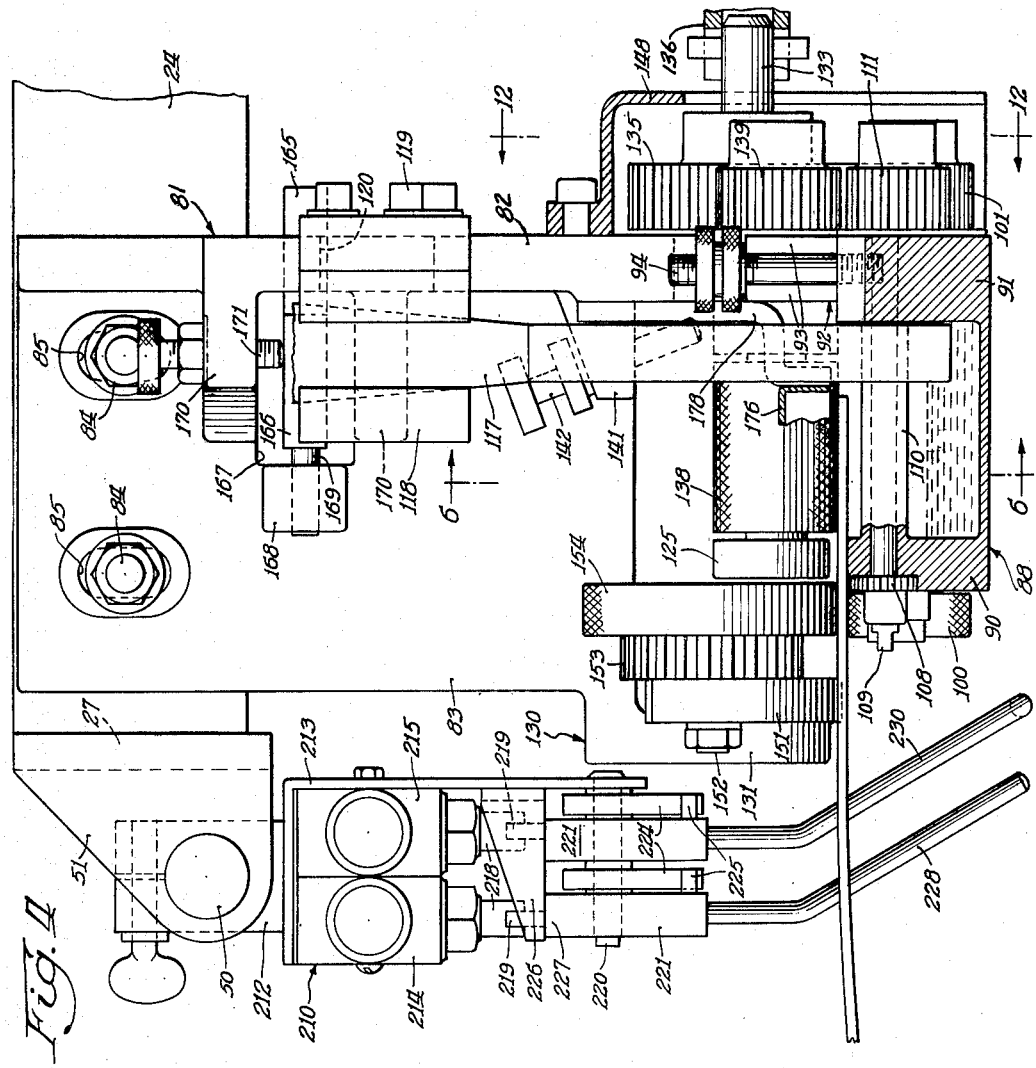
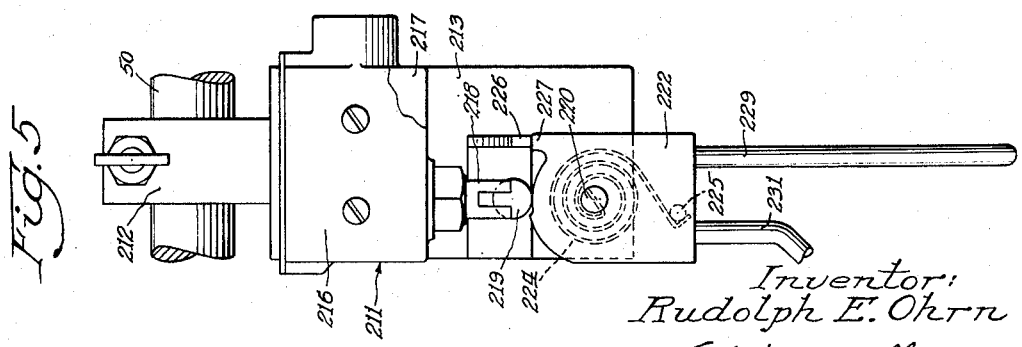
Inventor:
Rudolph E. Ohrn
By: EdWagonseller
Atty.

March 31, 1953 R. E. OHRN 2,633,063
GLUING MACHINE
Filed March 19, 1951 9 Sheets-Sheet 5
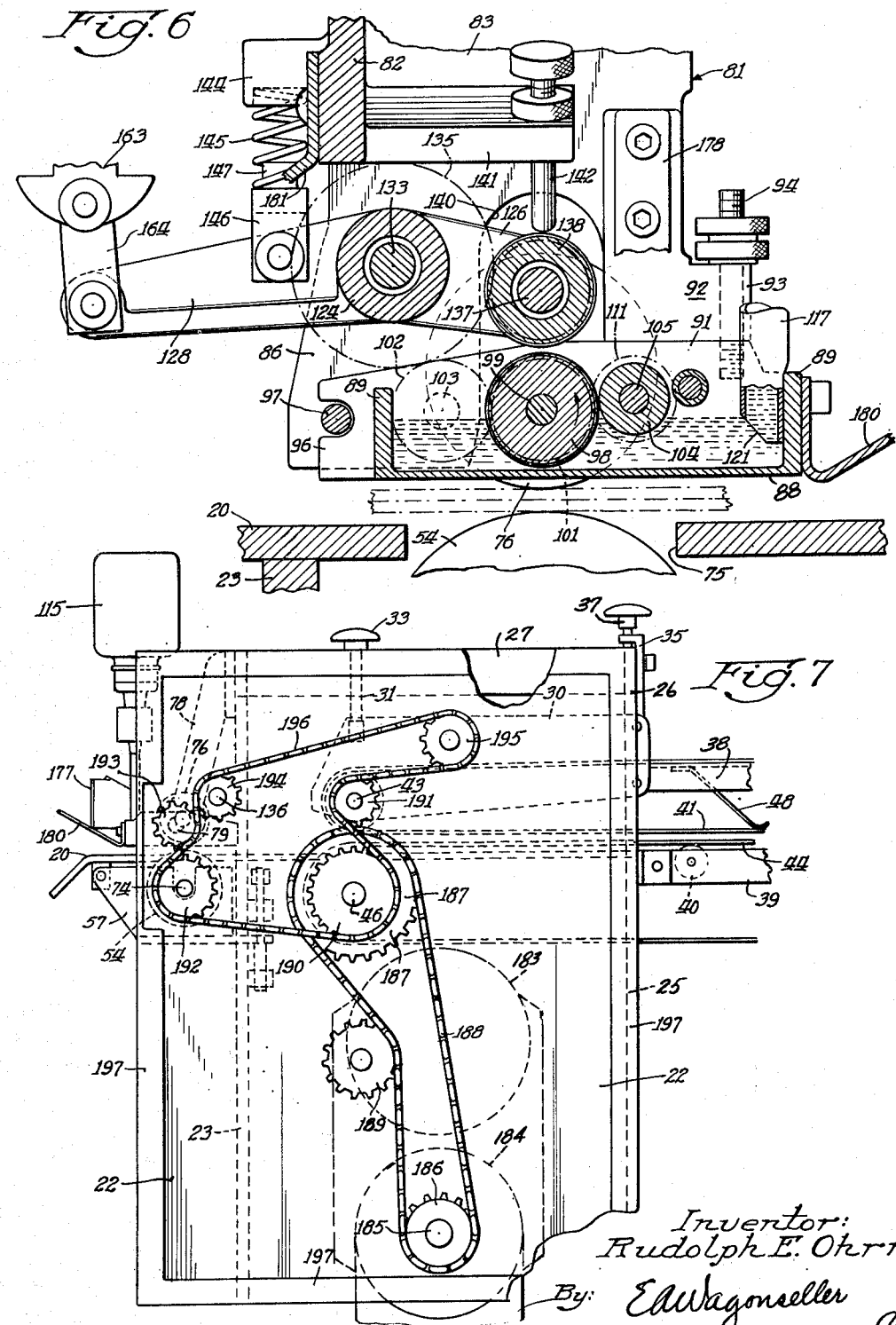

March 31, 1953   R. E. OHRN   2,633,063
GLUING MACHINE
Filed March 19, 1951   9 Sheets-Sheet 6
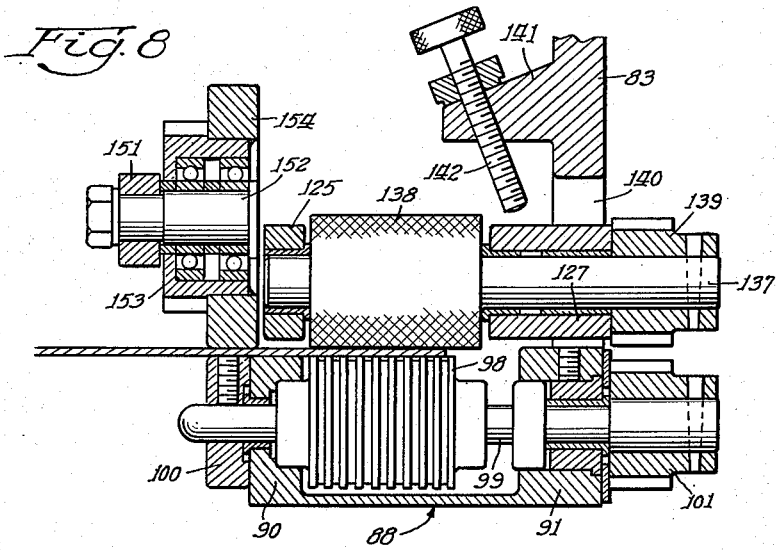
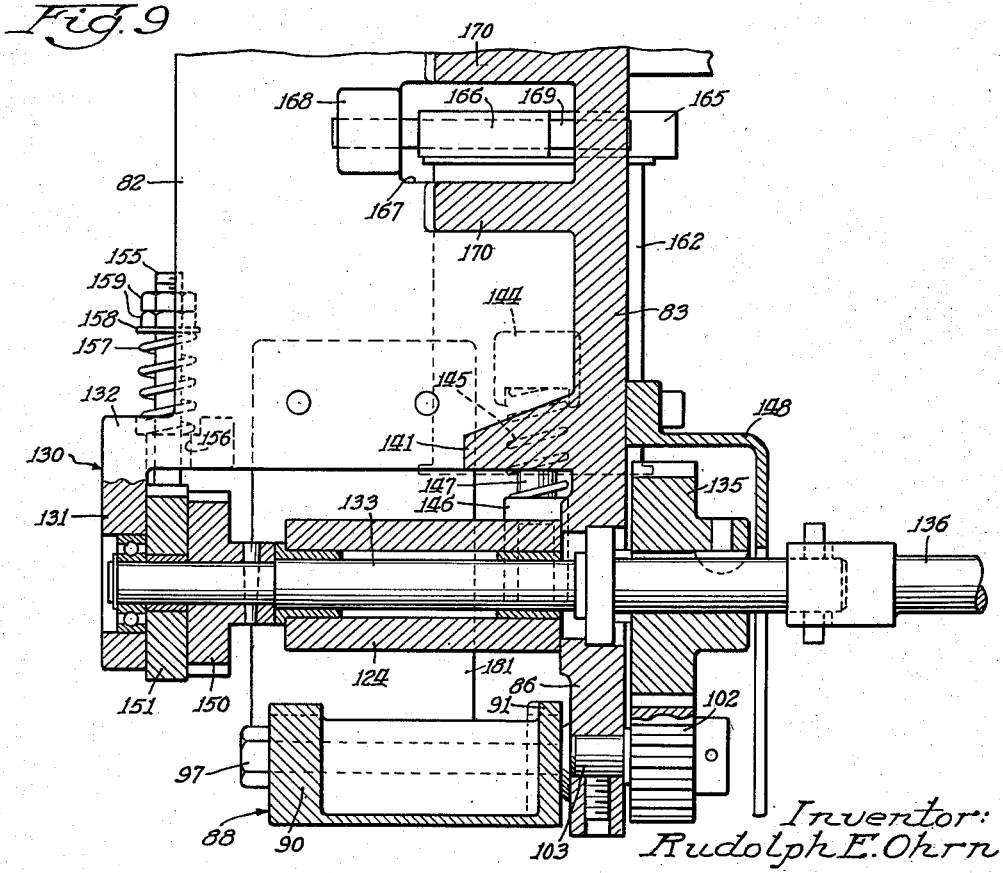
Inventor:
Rudolph E. Ohrn
By: Ed Wagonseller
Atty.

March 31, 1953 R. E. OHRN 2,633,063
GLUING MACHINE
Filed March 19, 1951 9 Sheets-Sheet 7
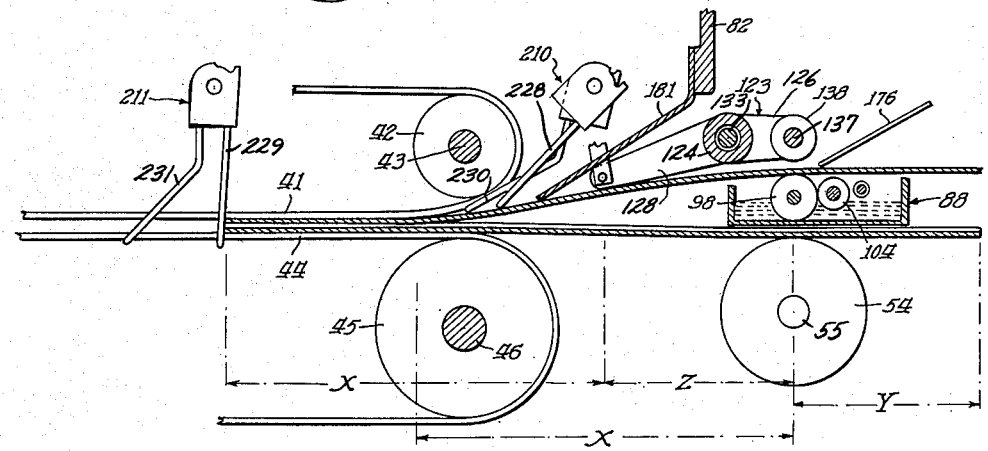
Inventor:
Rudolph E. Ohrn
By: Ed Wagonseller
Atty March 31, 1953  R. E. OHRN  2,633,063
GLUING MACHINE
Filed March 19, 1951  9 Sheets-Sheet 8

Inventor:
Rudolph E. Ohrn
By: Ed Wagonseller
Atty.

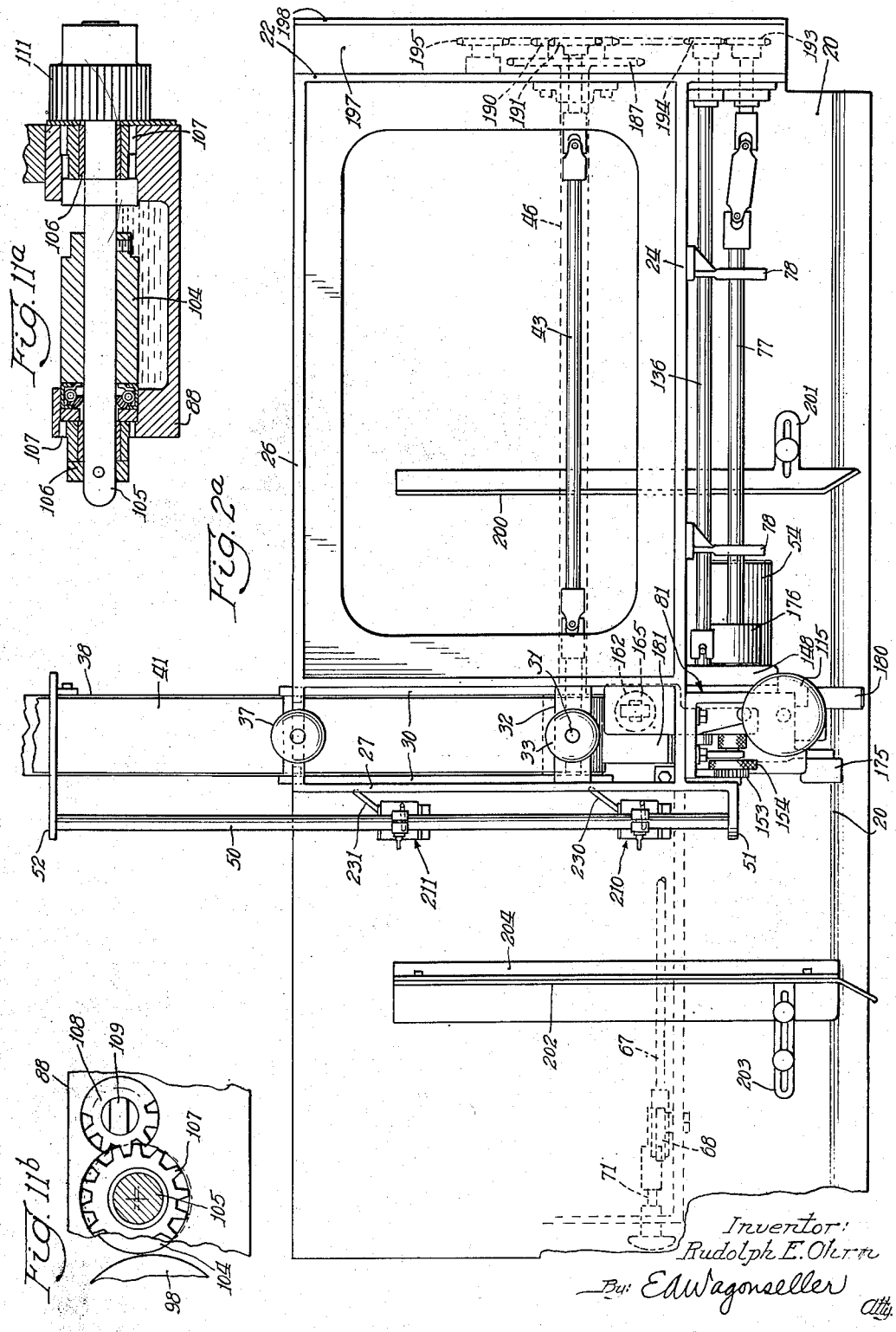

Patented Mar. 31, 1953

2,633,063

UNITED STATES PATENT OFFICE 2,633,063

GLUING MACHINE

Rudolph E. Ohrn, Rock Island, Ill., assignor to Container Corporation of America, Chicago, Ill., a corporation of Delaware Application March 19, 1951, Serial No. 216,370

9 Claims. (Cl. 93—36.4)

The present invention relates to a machine and method for gluing container blanks of paperboard, and more particularly to a novel method and what may be termed an open-head gluing machine for gluing such blanks folded to flat tubular but unsecured form, so as to provide tubular containers in collapsed condition.

By the method of this invention, a blank folded upon itself so that portions of opposite edges are overlapped, and thus defining a collapsed tube as yet unsecured, is moved in a direction parallel to the axis of such tube, and during such axial movement the blank is partially unfolded to space the upper or outer of the overlapped edge portions from the other although still in overlapping relation thereto, adhesive is applied to the inner surface of the outer edge portion as the blank movement continues, and the edge portions are then brought into contact and held together to cause their adherence. The machine comprises means for moving a blank folded into a flat unsecured tube with overlapping edge portions extending axially of the tube in a direction parallel to the tube axis, and a gluing mechanism supported in the path of the blank in such a manner that the major portion of the blank may pass therebelow while the upper or outer of the overlapping edge portions passes through the mechanism. A glue roll or other appropriate adhesive-applying member is mounted in the mechanism in such position that the upper edge passes thereover but not in contact therewith unless urged into adhesive-receiving contact by pressing means movably mounted in the mechanism. Suitable means are provided to operate the pressing means for movement to and from a pressing position as predetermined points on the upper edge come into contactible relation with the glue roll, and means operable by the blank to control the operating means are included in the machine. Thus only a selected portion or spaced portions of the upper edge are coated with adhesive. In the present embodiment, the pressing means is in the form of a roll carried by a rockable member disposed above the glue roll and operated by means including a solenoid. Switch means for controlling the solenoid are adjustably mounted along the path of the blank to be engaged thereby, so that the blank automatically controls the glue-applying operation.

The machine and method disclosed herein provide for the rapid, positive, and efficient gluing of container blanks into tubular form. The machine is simple and inexpensive in construction and operation, and is very compact because it need be no wider than half the extent of the widest blank to be glued thereby, and may be relatively short. The machine is somewhat comparable to an open-head stitching machine, and may be arranged as an alternate to such a stitching machine, so that either may be used on blanks of the same style or type, according to the kind of securement desired. The awkward, space-requiring operations necessitated in prior gluing machines and methods by the fact that blanks are first glued in flat, fully extended form and then folded into tubes are avoided. The machine is readily adaptable to any type of blank for a tubular container or the like, though it is most important in the gluing of blanks for containers having a tubular body and top and bottom closure flaps which are not to have glue applied thereto, and it operates equally well on inside or outside glue flap containers. The machine is very flexible in that it is quickly adjustable to blanks of a wide range of sizes and proportions.

It is an object of this invention to provide an open-head machine and a method for gluing the manufacturer's joint of a tubular paperboard container prefolded into tubular form. Another object is to provide a simple method and machine for gluing paperboard container blanks in tubular form. An additional object is the provision of a machine and method for gluing a paperboard blank folded to tubular form along a predetermined area paralleling the axis thereof. A further object is the provision of a machine for gluing axially extending overlapped edge portions of a tubularly folded paperboard container blank, which is adjustable for gluing along only a portion of the axial length of the blank. It is also an object of the invention to provide a machine for gluing tubularly folded paperboard blanks which includes mechanism operable by the blanks to effect gluing at predetermined axially located areas of edge portions of the blanks. Still another object is the provision of a machine and method for gluing paperboard blanks prefolded to tubular form without requiring unfolding or further folding thereof. It is a still further object to provide a machine for gluing paperboard container blanks in tubular form which is relatively simple and inexpensive to construct and operate, and which may be of compact, space-saving construction.

Other and further objects, advantages, and features of the invention will be apparent to those skilled in the art from the following description, taken with the accompanying drawings, in which:

Fig. 2a is a horizontal plan view of the rear portion of the machine;

Fig. 2b is a partial vertical cross sectional view taken along line 2b—2b of Fig. 2;

Fig. 4 is a rear elevation, partly in section, of the mechanism shown in Fig. 3 and a switch means therefor;

Fig. 5 is a side elevation of switch means such as shown in Fig. 4;

Fig. 6 is a fragmentary vertical sectional view taken substantially on the line 6—6 of Fig. 4;

Fig. 7 is a side elevation of driving means for various parts of the machine, seen in end elevation in Fig. 1;

Fig. 8 is a vertical sectional view taken substantially on the line 8—8 of Fig. 3;

Fig. 9 is a vertical sectional view taken substantially on the line 9—9 of Fig. 3;

Fig. 10 is a side elevation, partly in section and with certain parts omitted, of a portion of the machine with a container blank passing therethrough;

Fig. 11 is a horizontal sectional view taken substantially on the line 11—11 of Fig. 3;

Fig. 11a is a transverse vertical sectional view taken substantially as indicated by the line 11a—11a of Fig. 11;

Fig. 11b is an enlarged fragmentary side elevational view, partly in section, of a portion of the structure shown in Fig. 3;

Fig. 12 is a reduced vertical sectional view taken substantially as indicated by the line 12—12 of Fig. 4;

Figure 1:
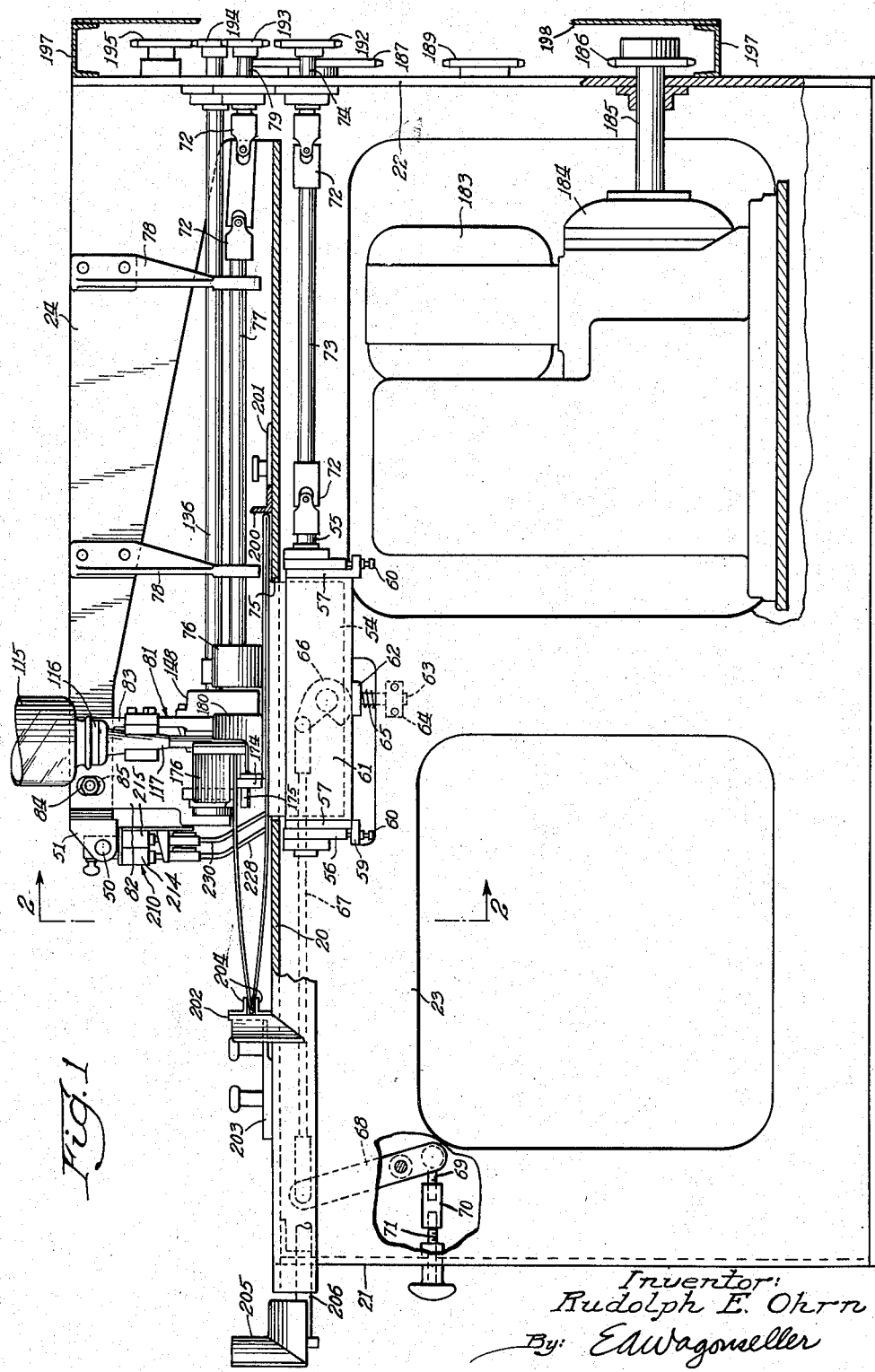
Fig. 1 is an end elevation of the machine from the rear or feeding end thereof.

Referring to the drawings, the machine includes a forward portion and a rear portion at which container blanks are fed for substantially straight-line movement forwardly through the machine. The rear portion comprises a table-like base formed by a horizontal plate member 20 of greater extent transversely of the machine than longitudinally, which is supported at a desired height by a support 21 at its left edge as viewed in Fig. 1, a support 22 at its right edge which projects above the plate member 20, and a rear support 23 disposed forwardly of the rear edge of the member 20. Adjacent the support 22, the support 23 extends above the plate member and has an upper frame portion 24 extending thereover toward the left side of the machine and terminating adjacent the center of the plate member. At the forward edge of the plate member 20 is a transverse support 25 generally similar to the support 23, and similarly projecting above the plate member adjacent the side support 22, with an upper frame portion 26 extending over the member 20, substantially similar and parallel to the frame portion 24. An upper frame member 27 extending longitudinally of the machine connects the ends of the frame portions 24 and 26. The supports are of generally plate-like formation, and the supports 21, 23, and 25 may have weight-reducing apertures therein, but the support 22 is preferably continuous except for apertures to accommodate shafts projecting therethrough as hereinafter explained. The upper portion of the support 22, the frame portions 24 and 26, and the frame member 27 provide a substantially rectangular, rigid upper frame spaced above the plate member 20. Supported from the rear portion of the upper frame in spaced relation to the plate member is a mechanism for applying adhesive to container blanks which is later described.

A pair of parallel supporting plates 30 (Figs. 2 and 7) held in spaced relation by suitable means is disposed below the upper frame member 27, supported in vertically adjustable relation from the upper frame. The plates 30 extend longitudinally of the machine, their rear ends being disposed forwardly of the adhesive-applying mechanism and their forward ends adjacent the frame portion 26. A bolt 31 is secured between the rear ends of the plates 30 and extends upwardly through a horizontal portion of an angle bracket 32 on the inner face of the frame member 27. An adjusting nut 33 disposed on the bolt and bearing on the bracket 32 may be rotated to raise or lower the rear ends of the plates. A vertically extending member 35 (Figs. 2 and 2b) is secured at its lower end to the forward ends of the plates 30 by means of the shaft 263 and contains a vertical slot 261 which cooperates with shoulder bolt 260 to allow member 35 to slide vertically on the forward face of the frame portion 26. Member 35 is also provided at its upper end with a lug 36 extending over the top of the portion 26. A bolt member 37 is threaded through the lug to have its lower end bear on the top edge of the portion 26, so that when it is rotated the forward ends of the plates 30 are raised or lowered.

A conveyor supporting structure extends forwardly of the support 25, and includes a horizontally disposed upper member 38 which may be an angle member. The rear end of the member 38 is connected to the plates 30 below the member 35 by means of the shaft 262 (Fig. 2b), and any suitable means may be provided to support the forward portion thereof. Below the member 38 are a pair of horizontal rails 39 supporting a series of rollers 40. At their rear ends the rails are secured to the support 25, and are supported forwardly thereof by any suitable means. An upper endless conveyor belt 41 passes about a pulley (not shown) at the forward end of the upper member 38 and a driving pulley 42 suitably mounted between the rear portions of the supporting plates 30 on a shaft 43 which projects through the support 22. The shaft 43 has opposite end portions journaled at the plates 30 and the support 22, and a central portion joined to the end portions by universal connections or the like, so that the end portions may be shifted out of axial alinement and yet rotate together. The upper run of the belt 41 may conveniently be supported on the member 38. A lower endless conveyor belt 44 passes about a pulley (not shown) at the forward ends of the rails 39 and about a driving pulley 45 on a shaft 46 suitably journaled in brackets 47 below the plate member 20, which has a suitable aperture therein through which the pulley 45 projects slightly above the member 20. The shaft 46 projects through the support 22. The upper run of the belt 44 is supported on the rollers 40 and the member 20, directly below the lower run of the upper belt 41. A plurality of spring members 48 depending from the upper member 38 are provided bearing on the lower run of the belt 41 to apply pressure on blanks carried between the belts. The periphery of the pulley 42 is suitably spaced from the periphery of the pulley 45 so that a throat is provided at the rear ends of the belts to facilitate entry of container blanks between the belts. The position of the upper pulley 42 may be adjusted vertically to vary the throat opening by shifting the supporting plates 30 upwardly or downwardly in the manner described, the flexible shaft 43 maintaining the driving connection of the pulley. The throat may thus be varied to accommodate blanks of different length and made of paperboard of varying caliper or thickness so that the blanks may enter smoothly and without sharp bending between the belts. The pressure exerted by the spring members 48 is adjusted by raising or lowering the upper member 38 by means of the plates 30.

Extending longitudinally of the machine adjacent the frame member 27 is a horizontal rod 50 the rear end of which is supported by a bracket portion 51 at the rear end of the member 27, and the forward end of which may be supported in any suitable manner, as by a vertical member 52 secured to the upper member 38 of the conveyor supporting structure. The rod 50 may extend forwardly any desired distance. It serves as a support on which switch means later described may be adjustably positioned along the path of blanks passing through the machine.

Figure 2:
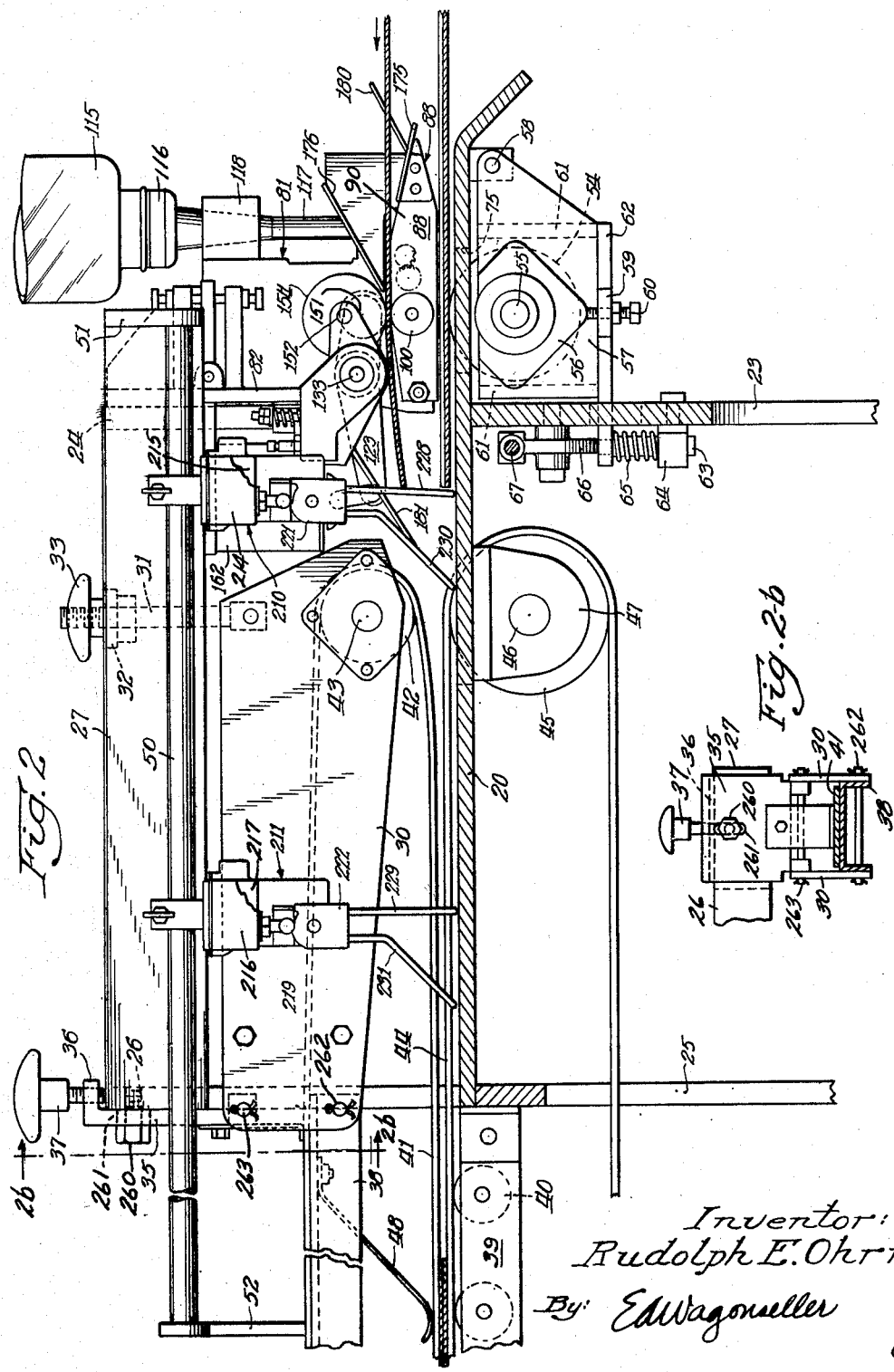
Fig. 2 is an enlarged vertical sectional view taken substantially on the line 2—2 of Fig. 1.

Container blanks folded to flat unsecured tubular form are delivered into the machine one at a time, either manually or by suitable means, and the machine is provided with means adjustable to various blank thicknesses which engage the delivered blanks and feed them forwardly. A feed roller 54 (Figs. 1, 6 and 10) is mounted on a shaft 55 suitably journaled in a pair of vertically adjustable bearing plates 56 each disposed adjacent one of a pair of parallel pivoting plates 57 extending longitudinally of the machine and pivotally supported below the plate member 20 as at 58 (Fig. 2). The pivoting plates 57 have outwardly extending lugs 59 at their lower edges through which are threaded adjusting bolts 60 the upper ends of which support the adjustable plates 56. The pivoting plates are connected by transverse members 61, to the bottom edges of which is secured a plate or bar 62 which projects forwardly of the rear support 23 through a suitable aperture therein. A pin 63 depends from the forward portion of bar 62 through a guide sleeve member 64 mounted on the support 23, to hold in position a coil spring 65 disposed between the bar 62 and the sleeve member to urge the bar upwardly. The feed roller 54 is thus biased to swing upwardly about the pivots of the plates 57. A cam 66 is pivoted on a suitable pin projecting from the forward face of the support 23 above the forward portion of the bar 62, so that it may act on the bar in opposition to the spring 65. A cam-actuating rod 67 extending toward the support 21 is pivotally connected at one end to the cam and at the other to the upper end of a lever 68 pivoted on the rear support 23 adjacent the side support 21. Pivoted to the lower end of the lever is a link 69 to which is fixed an internally threaded socket member 70 which receives a threaded portion of a screw member 71 rotatably supported projecting through the support 21. The feed roller 54 may thus be vertically adjusted by turning the screw member 71 to cause the cam 66 to swing the bar 62 downwardly or to permit the spring 65 to move the bar upwardly. The feed roller shaft 55 is connected by a universal joint 72 to one end of a connecting shaft 73 the other end of which is connected by another universal joint 72 to a sprocket shaft 74 which projects through the support 24. The feed roller 54 projects slightly above the plate member 20 through an aperture 75 therein. An upper feed roller 76 (Figs. 1, 6 and 7), substantially shorter than the roller 54, is disposed above the aperture 75 to cooperate with the lower roller in feeding blanks forwardly. The roller 76 is supported slightly to the right of the adhesive-applying mechanism on a shaft 77 (Fig. 1) suitably journaled in brackets 78 depending from the upper frame portion 24. The right end of the shaft 77 is connected by suitably arranged universal joints 72 to a sprocket shaft 79 projecting through the side support 22.

The adhesive-applying mechanism, disposed above the feed roller 54, is supported by a bracket 81 (Figs. 1, 2, 3, 4 and 6) having two wings 82 and 83 extending at right angles to each other. The wing 82 is disposed transversely of the machine, and is secured to the rear face of the upper frame portion 24 by bolts 84 (Fig. 4) passing through vertically elongated holes 85 in the upper part of wing 82, permitting limited vertical adjustment of the bracket 81. The other wing 83 extends longitudinally of the machine, and has a downward extension 86 (Figs. 3 and 9) at its lower end, adjacent the wing 82. A shallow adhesive receptacle or glue pan 88, of generally rectangular shape, is supported in spaced relation above the plate member 20 by the bracket wing 83. The glue pan has front and rear end walls 89, a left-hand side wall 90 of considerable thickness, and a right-hand side wall 91 of even greater thickness at its rear portion but reduced adjacent its forward end to accommodate the downward extension 86 of the wing 83. The thick rear portion of the wall 91 is disposed under the rear part of the bottom edge of the wing 83, which has a rearwardly extending lug 92 with a recess in its rear edge and spaced upstanding flange portions 93. A stud bolt 94 extending from the upper edge of the wall 91 is disposed between the flange portions 93, and carries a suitable nut which is tightened against the upper edges of the flange portions to secure the rear portion of the glue pan 88. The wall 90 is extended forwardly of the front end wall 89 to form a lug 95 with a slot in its forward edge, and a similar lug 96 is formed on the front end wall adjacent the wall 91. A stud bolt 97 projects horizontally through the downward extension 86, and the recessed lugs engage on this bolt to hold the forward portion of the glue pan in place.

Figure 3:
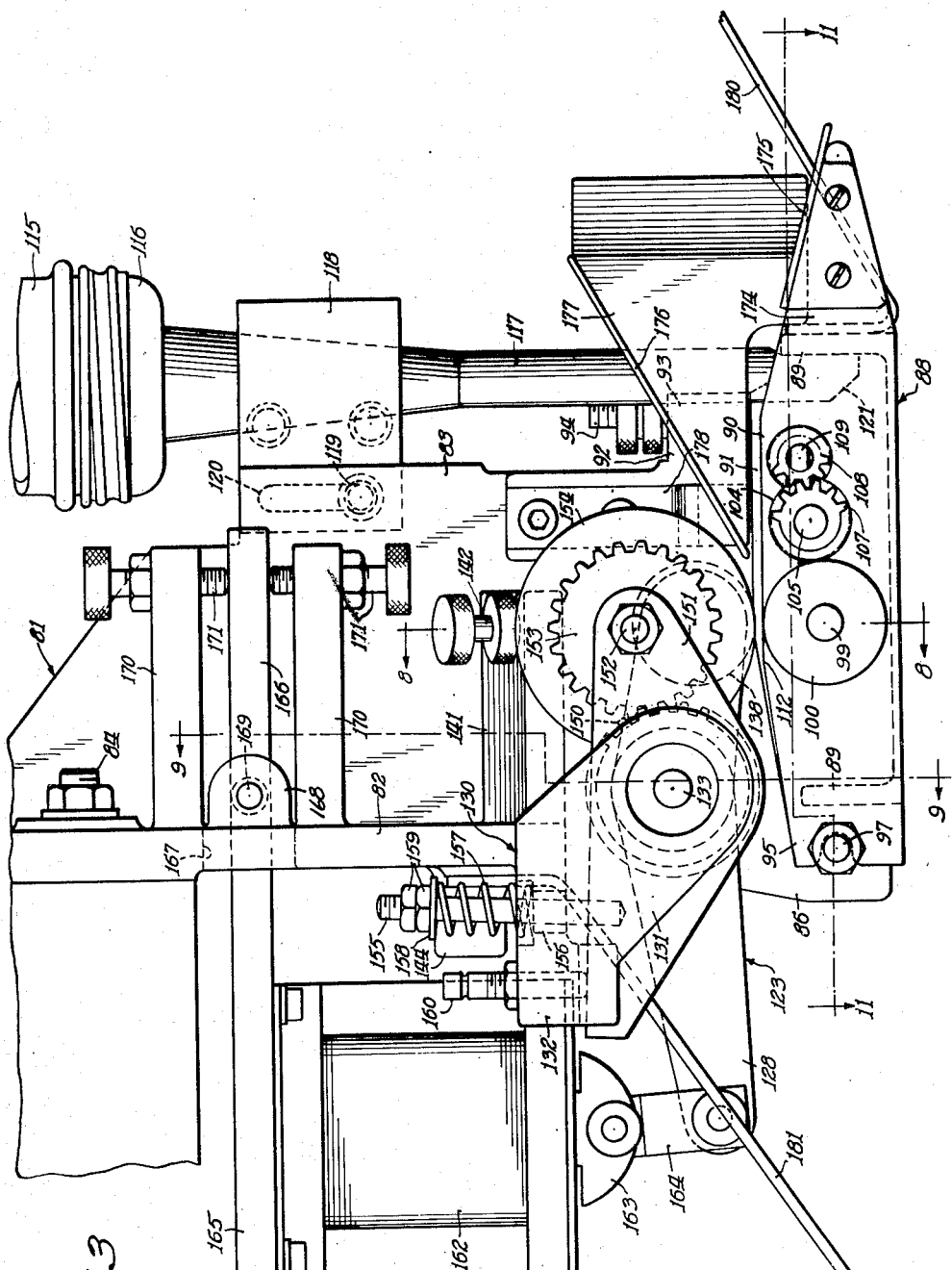
Fig. 3 is an enlarged side elevational view of the adhesive-applying mechanism shown in Fig. 2.

Rotatably mounted in the glue pan is a glue roll 98 (Figs. 6, 11 and 14) for applying adhesive to the container blanks. The glue roll may be of any desired type, and in this case is shown as provided with a series of parallel circumferential grooves for improved glue application. The roll 98 is secured on a shaft 99 projecting through the side walls 90 and 91, which are recessed to house suitable bearings therefor. A roller 100 (Figs. 3 and 4) with a knurled or otherwise roughened surface is secured on the end of the shaft 99 outwardly of the wall 90 to aid in moving a blank through the mechanism as hereinafter explained. On the other end of shaft 99, outwardly of the wall 91, is secured a gear 101, which meshes with an idler gear 102 (see also Fig. 9) rotatable on a stub shaft 103 secured in the downward extension 86. Just rearwardly of the glue roll 98 is a doctor or metering roll 104 (Figs. 3, 6 and 11) mounted on a shaft 105 parallel to shaft 99 and shiftable relative thereto for adjusting the spacing between the rolls 98 and 104. To provide for such shifting, circular recesses or apertures are provided in the opposite side walls of the receptacle 88. The shaft 105 projects through the apertures and through bushings 106 extending eccentrically through the hubs of a pair of gears 107 so as to provide for relative rotation thereof. Due to the eccentric relationship, rotation of the gears 107 moves the shaft and its metering roll 104 rearwardly or forwardly relative to the glue roll 98 to allow fine adjustment. For rotating the gears 107, a pair of adjusting gears 108 meshing therewith are secured on the ends of a shaft 109 disposed in a hollow shaft housing 110 extending between the side walls 90 and 91 rearwardly of roll 104. The left-hand end of shaft 109 projects outwardly of side wall 90 and is formed for ready engagement by a suitable tool. On the right-hand end of shaft 105, which projects through the wall 91, is secured a gear 111 meshing with gear 101 on the glue roll shaft 99. The glue roll 98 (Figs. 6 and 11) is disposed so that its crown is substantially at, although preferably a few thousandths of an inch below, the level of the upper edge of the side wall 90, which edge extends horizontally from a point adjacent the rear end of the glue pan to a point appreciably spaced forwardly of the crown of the roll, for example a point indicated at 112 (Fig. 3). The rear and forward portions of the top edge of wall 90 preferably are inclined downwardly.

Adhesive may be supplied to the glue pan 88 in any suitable manner. In the present embodiment, adhesive is held in an inverted jar 115 or other closed container, the mouth of which is closed by a cap 116 having a spout 117 extending down into the glue pan. The spout has a conical portion adjacent the cap seated and secured in a clamping bracket 118 which is secured to the bracket wing 83 by a screw 119 extending through a vertical adjusting slot 120. The jar and spout are thus held firmly in the desired position, rearwardly of the wing 83. The mouth of the spout is cut away at an angle, as shown at 121, so that when the level of the adhesive in the pan 88 falls below the top of the opening so provided, air may pass up the spout and permit adhesive to flow down into the glue pan.

Figure 14:
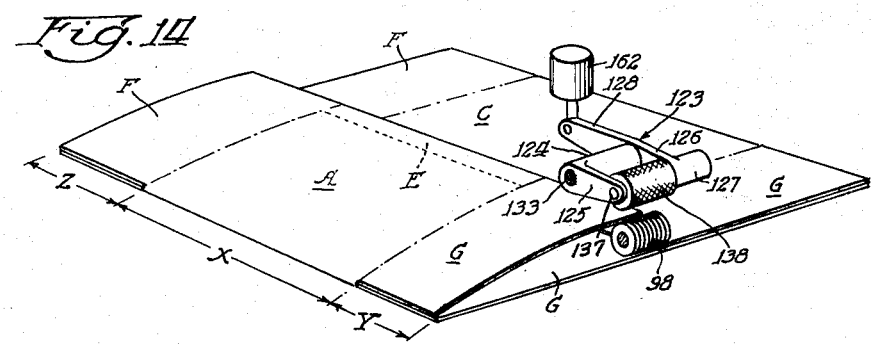
Fig. 14 is a view of the blank in folded condition passing through adhesive-applying means which are shown diagrammatically.

Referring now to Figs. 2, 3, 10 and 14, above the glue pan there is pivotally mounted a rocking member 123, best shown as a whole in Fig. 14. The rocking member has a hollow central hub portion 124 adapted to receive a shaft, and a pair of parallel arms 125 and 126 extending rearwardly from the hub portion. The left-hand arm 125 has a shaft-receiving aperture at its rear end, while the right-hand arm 126 has at its rear end a boss 127 extending toward the right. An aperture extends through the arm 126 and boss 127 in alinement with the aperture in the arm 125. A third arm 128 extends forwardly from the hub portion 124 in alinement with the arm 126.

At the lower end of the bracket wing 82 is an extension 130 having a hanger portion 131 (Figs. 3 and 9) extending downwardly and rearwardly parallel to the extension 86 of the bracket wing 83 and spaced outwardly of the glue pan side wall 90. The extension 130 also has a horizontal flange portion 132 extending forwardly from the bottom of the wing 82. A driving shaft 133 for the adhesive-applying mechanism, extending parallel to the glue roll shaft 99, is journaled in suitable bearings disposed in alined apertures in the hanger portion 131 and the downward extension 86. The right end of the shaft 133 (Figs. 4 and 9) projects through the extension 86 and has secured thereon a gear 135 in mesh with the idler gear 102. The projecting end of the shaft is joined by any appropriate means, as for example the pin and socket connection illustrated, to an extension shaft 136 which projects through the support 22. The central portion 124 of the rocking member 123 is pivotally mounted on the shaft 133 between the extension 86 and the hanger portion 131, the arm 128 extending forwardly beyond and below the wing 82 of the bracket 81, and the arms 125 and 126 being disposed with their ends above the glue roll 98. A shaft 137 (Figs. 8, 10 and 14) is journaled in the apertures at the rear ends of the arms 125 and 126, and carries a pressure roll 138 preferably with a roughened surface, disposed between the arms and movable thereby toward and from the glue roll. The pressure roll 138 has substantially the same diameter as the glue roll 98, and is arranged to swing in an arc passing through the crown of the latter. The shaft 137 projects from the boss 127, and has fixed on its projecting end a gear 139 meshing with the gear 135 (Figs. 6, 9 and 12). It will be seen that the gear 135 drives the gear 139 directly, and the gears 101 and 111 indirectly through the idler gear 102. The gears 101, 102, and 139 have the same radius. Referring now to Figs. 6 and 8 boss 127 extends into the plane of bracket wing 83, and provision is made to accommodate it and permit pivotal movement of the rocking member 123 by a slot 140 extending upwardly from the bottom edge of the wing. The forward edge of the slot may conveniently be an extension of the rear edge of the wing extension 86. Projecting from the left face of wing 83 above the slot 140 is a ledge 141 the upper surface of which slopes downwardly away from the wing, and threadedly working in the ledge at right angles to its upper surface is a stop screw 142 the lower end of which is disposed above the boss 127 and forward end of the arm 126 to be engageable thereby if excessive upward movement of the arms 125 and 126 should occur for any reason. The extreme limit of upward movement of the rear portion of the rocking member is thus controlled by the screw 142, and may be varied by adjustment of the screw. The pressure roll is biased to an upper position spaced from the glue roll by means acting on the forwardly extending arm 128 of the rocking member 123 to urge the arm downwardly. These means comprise a boss 144 extending forwardly from the bracket wing 82 above the arm 128 and having a recess in its bottom surface to receive the upper end of a coil spring 145 the lower end of which bears on a bifurcated member 146 pivoted to the arm. The member 146 has a stud 147 extending into the spring to prevent its displacement. A suitable housing 148 for the gears 135, 139, 101, 102, and 111 may be secured on the wing 83.

Referring now to Figs. 3 and 9, a gear 150 is secured on the driving shaft 133 between the hub portion 124 of the rocking member and the hanger portion 131. Between the gear 150 and the hanger portion there is disposed a pivot plate 151 (see also Fig. 2) which is pivoted at its central portion on the shaft 133, similarly to the rocking member 123. At its rear end the plate 151 carries a stub shaft 152 on which are rotatably mounted a gear 153 in mesh with the gear 150, and a roller 154 above and in the plane of the roller 100, so that it may be brought closely adjacent the crown of the latter. The roller 154 and gear 153 are secured together for rotation as a unit by any suitable means, as for instance a weld. The forward portion of the pivot plate 151 extends below the flange portion 132 of the extension 130 at the bottom of the bracket wing 82, and has a stud bolt 155 extending from its upper edge freely through an aperture 156 in the flange portion 132 which has a counterbore at its upper end, and through a coil spring 157 which has its lower end seated in the counterbore and its upper end bearing against a washer 158 on the bolt backed by a pair of nuts 159. The washer may be positioned at any desired point along the bolt 155 to adjust the compression of the spring, which thus biases the forward portion of the pivot plate 151 upwardly to urge the roller 154 downwardly toward the roller 100. Forwardly of the aperture 156, a stop pin 160 is threaded through the flange portion 132, with its lower end engaging the upper edge of the pivot plate for adjustably positioning the roller 154 relative to the roller 100. The adjustment is such that the two rollers are spaced by slightly less than the thickness of the container blank so as to engage the upper and lower faces of a portion of the blank to draw it past the glue roll. While the roller 154 is of greater diameter than the roller 100, the gear train including the gears 153, 150, 135, 102 and 101 is designed according to engineering exigencies so that the peripheral speeds of both rollers are substantially the same.

Disposed forwardly of the bracket wing 82 and above the arm 128 of the rocking member 123 is a solenoid 162 (Figs. 2, 3 and 14) with its core 163 projecting downwardly therefrom. A suitable link 164 pivotally connects the core 163 and the arm 128, so that when the core moves upwardly the pressure roll 138 is swung downwardly by the rocking member. Such upward movement of the core 163 is effected by energization of the solenoid. When the solenoid is deenergized, the core drops downwardly and the arm 128 is free to move downwardly under the influence of the spring 145 to swing the pressure roll upwardly away from the glue roll 98. The solenoid 162 is suspended from a horizontal supporting plate 165 (Fig. 3) having a rearwardly extending portion 166 projecting through an opening 167 in the bracket wing 82. A boss 168 formed on the wing 82 receives one end of a pin 169 and the other end of the pin is received in the wing 83. The pin 169 passes through the medial regions of the plate 165 and thus serves to pivotally support the plate for limited swinging movements about the horizontal axis of the pin. A pair of horizontal ledges 170, one above and one below the pivot pin 169, extend between the wings 82 and 83 and straddle the extension 166 of the plate 165. A pair of adjusting screws 171 are threaded through the ledges 170 in opposition to each other to engage the opposite faces of the extension for holding it in a desired position. The solenoid 162 may thus be raised or lowered to adjust it to a desired relation to the rocking member 123 by adjustment of the plate extension 166.

The left side wall 90 (Figs. 2 and 3) of the glue pan 88 extends rearwardly of the rear end wall 89 to provide a guiding horn 174 with its upper surface sloping upwardly and forwardly to the horizontal portion of the top edge of the wall 90. A guide plate 175 substantially flush with the upper surface of the horn may be secured to the horn by a downwardly bent portion to widen the guiding surface. Above the glue pan is a guide plate 176 extending upwardly and rearwardly from a point slightly above the metering roll 104 and below the roll 154. Extending downwardly from the right-hand side of the guide plate 176 is a vertical portion 177 disposed just to the left of the adhesive-supplying spout 117 and substantially in the plane of the right-hand edge of the gluing surface of the glue roll 98. The guide plate 176 is relatively wide and extends to the left outwardly of the plane of the glue pan side wall 90. A suitably bent bracket strip 178, to which the vertical portion 177 is secured by welding or otherwise, is fastened by screws or other means to the bracket wing 83 adjacent the rear edge thereof for supporting the vertical portion 177 and guide plate 176 in position. The rear part of portion 177 is curved to the right. Another guide plate 180 extends upwardly and rearwardly from the rear end of the bottom of the glue pan, to the rear end wall of which it may be secured by an upwardly bent portion. The guide plate 180 is of general L shape, with its lower portion, below the plane of the upper surface of the horn 174, extending practically the width of the glue pan, while its upper portion is relatively narrow, with its left-hand edge lying to the right of the vertical portion 177. The guide plate 180 thus cannot interfere with a blank portion guided over the glue pan, yet serves to guide another blank portion under the glue pan, as more fully explained hereinafter. Secured to the front face of the bracket wing 82 and extending downwardly and forwardly therefrom is a guide plate 181 (Fig. 10), the forward edge of which is located adjacent the rear ends of the conveyor belts 41 and 44. The guide plate 181 facilitates passage of container blanks from the adhesive-applying mechanism to the belts.

Below the plate member 20 there is suitably mounted a motor 183 (Figs. 1 and 7) which is connected through a variable speed controller 184 to a shaft 185 which projects through the support 22 and has a sprocket wheel 186 secured thereon adjacent the outer face of the support. On the end of the lower pulley shaft 46 extending through the support 22 is fixed a sprocket 187. A sprocket chain 188 is arranged to drive the sprocket 187, and thereby the shaft 46, from the sprocket 186. An idler sprocket 189 engaging with the chain 188 is carried by the support 22, as on a stub shaft projecting from the support. On the pulley shaft 46 adjacent the sprocket 187 is secured another sprocket 190. In the plane of the sprocket 190, sprockets 191, 192, 193, and 194 are respectively secured on the upper pulley shaft 43, the sprocket shaft 74 connected to the lower feed roll shaft 55, the sprocket shaft 79 connected to the upper feed roll shaft 77, and the connecting shaft 136 joined to the gear driving shaft 133. An idler sprocket 195 is suitably mounted on the support 22 above and forwardly of the sprocket 191. A sprocket chain 196 is trained about the sprockets 190 to 195 inclusive to drive the various shafts in the desired directions. Suitable bearings are of course provided for the shafts adjacent the support 22. A housing for the sprocket means may be provided by arranging in a rectangle about the sprockets four channel members 197 each with one side secured to the support 22 and the other defining one edge of an opening closeable by a suitable closure plate 198.

Figure 13:
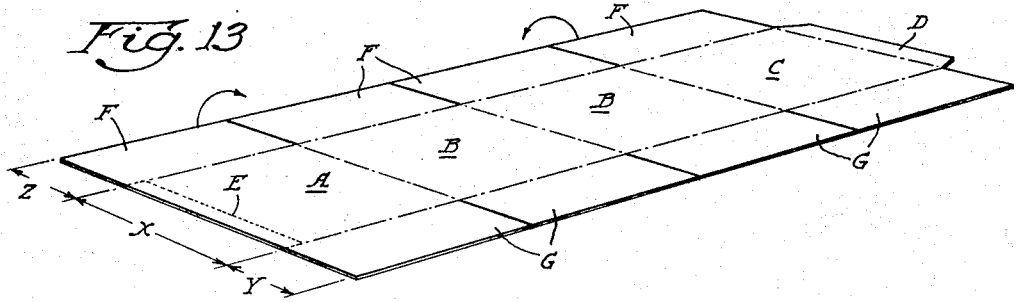
Fig. 13 is a perspective view of a container blank which may be glued by the machine.

Before the remaining parts of the machine are described, the action of the adhesive-applying mechanism may advantageously be explained. A paperboard container blank like that shown in Fig. 13 is to be glued to form a container with an inside glue lap. The blank has four serially connected side wall panels, a glue flap, and top and bottom closure flaps on the side wall panels. The side wall panel at the left end of the blank as viewed in Fig. 13 is designated A, and has its right-hand edge connected to one of two inner or intermediate panels B, B, the other of which is connected to the side wall panel C at the right end of the blank. A glue flap D is hinged on the right-hand edge of panel C. A glue area E along the left-hand edge of panel A is to have adhesive applied thereto for securement to the glue flap D. Top and bottom closure flaps F and G, respectively, are hinged on opposite edges of each side wall panel. To form the blank into a container by the machine and according to the method disclosed, the blank is first folded upon itself as indicated by the arrows so that the panels A and C overlie the two inner panels B and the flap D extends under the area E, as shown in Fig. 14. Except for securement of the flap, the blank is then in the same collapsed or flat tubular form in which the completed container is stored and shipped, and from which it is set up for use by disposing the side wall panels to define a rectangular tube closed at its opposite ends by the folding of the flaps F and G into perpendicular relation with the side walls. The flat, unsecured tube into which the blank is folded is fed into the machine in a direction parallel to the axis of the tube, with the flaps F at its forward or leading end and the flaps G at the trailing end. Because of the natural or inherent resilience of the paperboard, the folded panels A and C with their attached flaps tend to spring upwardly, which is advantageous since the free edge with the area E is to pass through the adhesive-applying mechanism in spaced relation above the remainder of the blank.

Adjacent the rear edge of the plate member 20 are two vertical longitudinally extending guides to engage the folded edges of the blank as it is fed into the machine for locating it properly relative to the adhesive-applying mechanism. One guide 200 (Fig. 1), at the right of the mechanism, is carried by a slide 201 movable in a transversely extending slot and securable at a desired point by any suitable means. The other guide 202, located to the left of the adhesive-applying mechanism, is secured on a slide 203 also working in a transverse slot and having means for releasably securing it. As shown the guides 200 and 202 have their rear portions curved away from each other as shown in Fig. 2a. The guide 202 may also include two vertically spaced horizontal members 204 extending from its right-hand face. To accommodate blanks of exceptionally large size, an additional guide element 205 is provided which has a vertical edge guide portion and a horizontal supporting portion. The guide element 205 is mounted outwardly of the left-hand edge of the plate member 20 on rods 206 or the like which extend through the support 21 and are movable transversely thereof to position the guide element.

The blank is fed into the machine with its right-hand folded edge engaging the guide 200 and its left-hand folded edge engaging the guide 202 between the members 204, unless the blank is of very large size, when the left-hand folded edge may engage the vertical portion of guide element 205. The guides are set so that the free edge of the blank having the area E to be coated with adhesive, or in other words the left-hand edge in Fig. 13, will extend to the right of the vertical plane of the left-hand edge of the glue roll 98 by only the width of the area E. As the blank is moved forwardly into the machine, this free edge, which for convenience may be termed the upper edge, passes upwardly over the horn 174 and guide plate 175 to engage against the guide plate 176, by which it is guided over the glue roll 98 but not into contact therewith. The glue flap D, comprising a portion of the opposite free edge of the blank, and the panel C to which it is attached, are deflected downwardly by the guide plate 180 to pass under the mechanism, and this panel C together with the inner panels B is engaged between the feed rollers 54 and 76 to be moved thereby past the mechanism. It is of course clear that the flaps F precede the panels A, B, and C in the courses just explained, while the flaps G follow the panels. Adhesive is not to be applied to the flaps F and G connected to panel A, but only to that portion of the free edge extending between the flaps F and G, that is, the free edge of panel A, or area E. To the left of the upper free edge, the blank is engaged between the rollers 100 and 154, which serve as auxiliary feed rolls to assure passage of the upper part of the blank through the adhesive-applying mechanism at the same rate of speed that the lower part passes below it, and thus avoid possible jamming of the blank or relative twisting which might cause misapplication of adhesive. Because of the resilience of the blank, the upper free edge springs upwardly away from the glue roll 98 and does not come into adhesive-receiving contact therewith unless pressed downwardly by the pressure roll 138. Although the upper part of the blank passes between the rolls 100 and 154 at substantially the level of the crown of the glue roll, this is at a point appreciably spaced outwardly or to the left of the glue roll, and the blank material to the right of these auxiliary feed rolls is therefore of sufficient extent to overcome any tendency of the rolls to bring the edge down enough to engage the glue roll. The horizontal portion of the top edge of the side wall 90, as already pointed out, extends for an appreciable distance both rearwardly and forwardly of the crown of glue roll 98. This horizontal edge supports the free edge of the blank adjacent the glue roll so that it cannot be brought into contact with the roll by bending of the blank forwardly or rearwardly of that point. The fact that the glue roll has its crown a few thousandths of an inch below the top of side wall 90 further assures that the upper free edge will not contact the glue roll unless pressed thereagainst.

The blank therefore moves through the mechanism without any adhesive being applied thereto until the forward end of the area E comes to the glue roll, whereupon the solenoid 162 is energized to cause the pressure roll 138 to swing against the upper surface of this portion of the blank edge and press its lower surface against the glue roll to receive a coat or film of adhesive therefrom. The solenoid remains energized, and the pressure roll therefore holds the upper free edge in contact with the glue roll, until the rearward end of the area E, or in other words the hinge line of the flap G, reaches the glue roll, when the solenoid is deenergized and the pressure roll is rocked upwardly and releases the upper free edge, which instantly springs up away from the glue roll. The solenoid 162 remains deenergized while the flap G passes through the mechanism, and until the area E of the following blank comes to position at the glue roll, when the adhesive-applying action is repeated. Energization and deenergization of the solenoid to cause the pressure roll 138 to press and release the blank at the desired points are effected respectively by switch means 210 and 211 supported by the rod 50 along the path of the blank and operated by the blank as it moves through the machine. The switch means 210 is disposed forwardly of the axis of the glue roll a distance equal to the length of the flaps B, or in other words the distance from the hinge line of the flap to the edge thereof parallel to the hinge line. This distance is designated Z in Figs. 10, 13, and 14. The switch means 211 is disposed forwardly of the switch means 210 by a distance equal to the height of the panel A, which distance is designated X; or in other words, the switch means 211 is spaced forwardly of the glue roll by the sum of X and Z. The solenoid is deenergized as the blank passes through the adhesive-applying mechanism until the leading edge of the blank engages the switch means 210 as shown in Fig. 2 and in its forward movement operates the same, energizing the solenoid and causing the pressure roll to effect contact of the upper free edge against the glue roll. At the moment its forward edge operates the switch means, the rear edge of the flap F is above the crown of the glue roll, and it is at this rear flap edge that the blank is pressed against the glue roll. The rear edge of flap F is defined by its hinge line, which also defines the forward edge of the panel A and the forward end of the area E which is to be coated with adhesive. The solenoid 162 remains energized, and the area E continues in contact with the glue roll, while the blank moves on with its forward portion passing switch means 210, under the guide plate 181, and between the conveyor belts 41 and 44, until the leading edge of the blank operatively engages the switch means 211 (see Fig. 10) to cause deenergization of the solenoid, effecting upward releasing movement of the pressure roll and springing of the blank out of contact with the glue roll, as previously explained. At the moment of operation of switch means 211, the rear edge of panel A, which is defined by the hinge line of the flap G and coincides with the rear end of the area E, is at the crown of the glue roll. Accordingly, it is at this point that release of the upper free edge of the blank from the glue roll is effected. The solenoid remains deenergized until the trailing edge of the blank passes the switch means 210, after which the switch means 210 can be operated by a following blank to again energize the solenoid. It will therefore be clear that adhesive is applied only to the selected area E, or in other words to a selected portion of the upper free edge, and not along the entire length of the upper free edge, so that undesired deposition of adhesive on other portions threof, in this case the portions along the flaps F and G, is avoided.

As the blank passes from the gluing mechanism to the belts 41 and 44, the upper free edge is deflected downwardly toward the lower free edge by the guide plate 181 so that entry of the blank into the throat between the belt pulleys is facilitated. Overlapping portions of the free edges, in this case the area E and glue flap D, come into registry as the blank passes between the belts and are held in contact by the belts so as to adhere to each other. The pressure applied by the spring members 48 as the blank is conveyed by the belts over the supporting rollers 40 assists in effecting such adhesion. The blank, now changed into a completed container in flat collapsed condition, is carried to the delivery or forward end of the machine by the conveyor belts and there discharged.

It will be seen that by adjustment of the spacing of the switch means 210 and 211 along the path of the blank, adhesive may be applied to the upper free edge for any desired part of its length. If desired, the free edge may have glue or the like applied along its entire length. By adjustment of the side guides 200 and 202 or 205, the width of the glued portion may be of any extent not greater than the length of the glue roll. The vertical portion 177 of the guide 176 serves to hold the upper free edge against projection beyond the right-hand edge of the glue roll.

In the example described, the container was intended to have an inside glue flap; that is, the glue flap was to be secured so as to extend along the interior face of the side wall with which it is overlapped. If an outside glue flap were to be used, the blank would be folded as in the example, except that the panels A and C would be folded so that the glue flap D would overlie the free edge of the panel A. The edge of the blank along which the glue flap D extends would then be passed through the adhesive-applying mechanism as the upper free edge, the blank being fed into the machine with the bottom closure flaps G as the leading portions thereof and the top flaps F trailing. Adhesive would be applied to the under surface of the flap D in the same way as described in connection with the area E, and the blank passed between the belts with the glue flap D overlying the lower free edge of the opposite panel A. The widened guiding surface provided by the guide plate 175 on the horn 174 is particularly advantageous in the case of an outside flap container, since the end edges of the flaps F and G adjacent the glue flap D in passing through the mechanism are spaced to the left of the edge of the glue flap, so that the leading end of the upper free edge might catch on the mechanism, or possibly tend to pass therebelow, during delivery of the blank to the machine, instead of moving smoothly up over the horn 174. The machine, as will be obvious, may readily be employed for gluing into tubular form blanks other than those of the specific type illustrated, for example blanks for half slotted containers, that is tubular containers with closure flaps at one end only, or container or liner elements having no closure flaps. Similarly, the machine may be used for applying other materials than adhesive to a selected portion of a blank, such a special coating or surfacing compositions. The machine may be adapted for intermittent gluing along the upper free edge of a blank by employing additional switch means properly disposed relative to the adhesive-applying mechanism to cause repeated engagement of the blank with the glue roll along axially spaced portions of the upper free edge.

The construction and operation of the switch means for controlling the solenoid 162 and thereby the application of adhesive to the blank will be described with particular reference to Figs. 4, 5, 10, and 15. The switch means 210 and 211 are substantially identical. Each is supported from the rod 50 by a split clamp 212 extending upwardly from the horizontal portion of an angle plate 213 the vertical portion of which extends downwardly from the right-hand edge of the horizontal portion. The switch means 210, best shown in Fig. 4, has a pair of encased switches, preferably microswitches, 214 and 215, disposed side by side under the horizontal angle plate portion with the switch 215 disposed against the upper part of the vertical plate portion. The switch means 211, shown in Fig. 5, has similar switches 216 and 217 corresponding respectively to the switches 214 and 215. The switches may be secured in position by screws extending through their casings and the angle plates 213, or other suitable means. The switches 214 and 216 are biased to normally open position, while the switches 215 and 217 are biased to normally closed position. Projecting through the bottoms of the casings of the switches 214 to 217 are downwardly urged plungers 218, which when moved upwardly reverse the normal open or closed condition of their associated switches. Each plunger has a roller 219 journaled at its lower end. Supported by the vertical portion of each angle plate 213 to extend horizontally below the adjacent pair of rollers 219 is a cam pivot pin 220. Pivotally mounted on the pin 220 of switch means 210 is a pair of cams 221 for switches 214 and 215. Similar cams 222 for the switches 216 and 217 are carried by the pin 220 of switch means 211. The upper edge of each cam is disposed below one of the plungers, and has a low portion on which the roller 219 rests in normal position of the parts and a high portion which moves under the roller to raise the plunger when the cam is rotated clockwise as viewed in Fig. 5. Adjacent each cam is a spring 224 one end of which is secured to the pin 220 and the other end of which bears on a pin 225 projecting from the right side of the cam. The spring biases the cam to rotate counterclockwise to a position determined by a stop 226, secured to and projecting to the left from the vertical portion of angle plate 213, against which an abutment 227 on the cam is adapted to engage for limiting the counterclockwise movement. Extending downwardly from cam 221 of switch 214 is a leg 228 which is bent to the right, as shown best in Fig. 4, and a similar leg 229 extends from the cam 222 of switch 216. A slightly different leg 230 depends from the cam 221 of switch 215; it is bent to the right like the legs 228 and 229, but is also bent to extend forwardly. The cam 222 of switch 217 has a leg 231 similar to the leg 230. The legs are bent to the right so as to extend athwart even a narrow blank passing through the machine, and the legs 230 and 231 extend forwardly of the legs 228 and 229 respectively adjacent thereto so that each is engaged by an advancing blank only after its associated leg 228 or 229 has been engaged.

Figure 15:
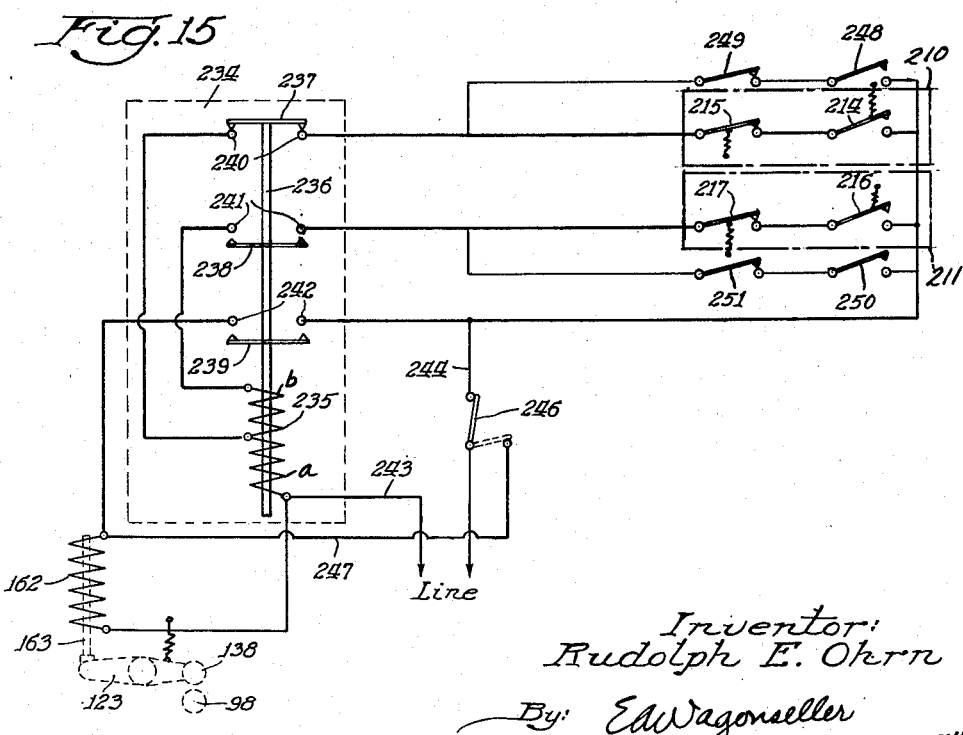
Fig. 15 is a diagram of a circuit arrangement for controlling the operation of the adhesive-applying mechanism.

When a blank moves against a leg, the leg is swung forwardly and the cam to which it is fixed is rotated clockwise to raise the plunger and operate the switch against its normal bias. The plunger is held in the elevated position until the trailing edge of the blank passes forwardly from under the leg, when the spring 224 returns the leg and cam to normal position. The switch means are arranged to operate a contactor of any suitable type for closing and opening a circuit through the solenoid 162 to energize and deenergize it. In Fig. 15, one possible type of contactor is illustrated diagrammatically. As already mentioned, switch means 210 causes energization of the solenoid, and switch means 211 causes deenergization. The two switches of each switch means are arranged in series, so that both must be closed to provide a complete circuit, though only one need be open to prevent establishment of a circuit.

In the diagram of a suitable circuit arrangement shown in Fig. 15, a contactor 234 of the magnetically held type is provided. The contactor has a coil 235 with a core 236 of suitable material which is sufficiently magnetized by energization of a portion of the coil to be moved from a normal position to another position and be maintained in such other position by its residual magnetism upon deenergization of the coil, and which is returned to its normal position upon energization of another portion of the coil, or the entire coil, and is again held in the normal position upon deenergization of the coil. Specifically, in the form of contactor shown, the core 236 is adapted to be moved from the normal position shown in Fig. 15 when the lower portion $a$ of the coil 235 is energized and is adapted to be returned to its normal position when the upper portion $b$ thereof, or when the entire coil including both portions $a$ and $b$ are energized. The core 236 carries switch members 237, 238, and 239 adapted to bridge pairs of spaced contacts 240, 241, and 242 respectively. In normal position of the core, shown in Fig. 15, the switch member 237 is disposed bridging the contacts 240 in circuit-closing relation, while the switch members 238 and 239 are held spaced from the contacts 241 and 242. A pair of conductors 243 and 244 lead to a suitable source of electric energy, and to one of these conductors, say conductor 243, one end of the coil 235, in this case the lower end, and one end of the coil of solenoid 162 are connected. The other end of the solenoid coil is connected to one of the contacts 242, the other contact 242 being connected to conductor 244. The other, or upper, end of coil 235 is connected to one of contacts 241, while the other contact 241 is connected to the conductor 244 through the switches 216 and 217 of the switch means 211, which as already mentioned are connected in series. One of the contacts 240 is connected to an intermediate point of the coil 235, and the other to the conductor 244 through the switches 214 and 215 of switch means 210.

With the parts in the positions shown in Fig. 15, closing of the switch 214 by a blank advancing through the machine completes a momentary circuit from conductor 244 through switches 214, 215, the contacts 240 of the switch member 237, and the lower portion $a$ of coil 235 to conductor 243. Current flows through the lower coil portion $a$ and causes the core 236 to move upwardly, moving the switch member 237 away from the contacts 240 and breaking the circuit therethrough. The core is thereafter held magnetically in its upper position. At the same time, the switch member 239 is moved into position connecting the contacts 242, thus establishing a circuit from the conductor 244, contacts 242 (now bridged), coil 162, and conductor 243, thus energizing the solenoid to move the pressure roll 138 to its pressing position. Although the switch member 238 is simultaneously moved into connecting engagement with the contacts 241, it completes no circuit because the switch 216 is open, but as it is held engaged with the contacts 241, a circuit can be established merely by closing of switch 216. As stated, the core 236 is held in its upper position even after the lower portion a of the coil 235 becomes deenergized, so that the solenoid 162 remains energized and the pressure roll 138 is maintained in its pressing position. Shortly after closing of the switch 214, switch 215 is opened by the advancing blank and held open thereby until the trailing edge of the blank passes leg 230, so that connecting engagement of switch member 237 with contacts 240, or closing of switch 214, cannot result in energization of the solenoid 162 before the blank moves past switch 215. When the leading edge of the blank closes the switch 216 of switch means 211, a momentary circuit is established leading from the conductor 244, through switches 216, 217, contacts 241 (now bridged), portions b and a of the coil 235, and conductor 243. The coil is thus energized to cause the core 236 to return to its normal position, moving the switch member 239 away from the contacts 242 to break the circuit through the solenoid 162, causing the pressure roll 138 to swing to releasing position. Then the swtch 217 is opened by the advancing blank to assure that the coil 235 will not be energized before the trailing edge of the blank has passed the leg 231, the switch 217 acting in substantially the same way as switch 215. If when the switch 216 is closed a portion of the blank is still under switch means 210, as is the usual case, the resulting movement of switch member 237 to circuit-closing relation with the contacts 240 does not effect energization of the lower portion of coil 235 because of the open switch 215, whether or not the blank is holding the switch 214 closed. Similarly, if the blank has cleared the switch means 210 but has not passed switch means 211, closing of switch 214 by a following blank, while causing energization of the solenoid 162 to effect movement of the pressure roll 138 to pressing position, does not result in establishment of a circuit through the contacts 241 by movement of the switch member 238 into bridging relation therewith, because the switch 217 is open. It will be seen that if switches 215 and 217 were not provided, the switches 214 and 216 would ordinarily be closed contemporaneously and the circuits through the contactor would "buck" each other, causing a rapid jigging of the core 236 and a consequent similar movement of the pressure roll between its pressing and releasing positions. The switches 215 and 217 also serve another purpose, in that if a blank is improperly fed so as to follow immediately behind a preceding blank, it will not cause the closing of any circuit, and therefore will not interfere with the desired circuit control by the preceding blank, or effect movement of the pressure roll 138.

If blanks for containers with outside glue flaps are being run through the machine, it is not necessary to move the pressure roll up and down, for there are no top and bottom closure flap portions preceding and following the glue flap which might come into contact with the glue roll. The pressure roll may therefore be held continuously in its pressing position, and the glue flaps will be urged against the glue roll as they pass between it and the pressure roll. To hold the pressure roll in its pressing position, the solenoid 162 is of course continuously energized. For this purpose, a manual switch 246 is inserted in the line 244. The switch 246 is movable between two positions, one shown in full lines and the other in dotted lines in Fig. 15. In the full-line position, the switch completes conductor 244 to connect the switches 214 to 217 inclusive with the electrical source, and in its dotted-line position connects the conductor 244 with a conductor 247 extending from the end of the solenoid coil opposite that connected to conductor 243. In this second position, the switch 246 thus completes an energizing circuit through the solenoid, and at the same time opens or breaks conductor 244 to disconnect the switch means and contactor from the electrical source so that they are rendered ineffective to cause actuation of the pressure roll 138. The switch means 210 and 211 therefore may be left in their normal positions in the path of the blank. If it is desired to save wear thereon, however, they may be swung about the rod 50 to bring the legs of the cams above the level of the blanks by first loosening and then refastening the clamps 212.

If it is desired to apply adhesive to a plurality of spaced portions of the upper free edge of a blank, additional switch means similar to switch means 210 and 211 can be secured on the bar 50 in positions determined by the portions to be glued. Such switch means are shown in the circuit diagram of Fig. 15 and their application should be clear from the description of the machine and its operation which has already been given.

It will be apparent that the present invention provides a method of gluing a blank for a tubular type paperboard container which, speaking broadly, comprises the folding of the blank into the form of a flat or collapsed tube substantially identical with the container in collapsed condition except it is not secured. In this flat unsecured tubular form, the blank has opposite edges extending parallel to the arix of the tube, with a portion of one edge overlying a portion of the other edge, the overlapped edge portions being the parts of the blank which are to be secured together to provide the collapsed container. The blank is then partially unfolded to space the overlapped edge portions from each other, through still in the overlapping relation. This is preferably accomplished by swinging the outer of the overlapped portions away from the other. Although the blank may be so far unfolded that the edge portions do not overlap, it is undesirable that the blank be unfolded more than necessary to accomplish the gluing, because of the extra time and motion involved. With the blank partially unfolded as described, adhesive is applied to the inner surface of the outer overlapping edge portion, and the blank thereupon restored to its fully folded condition, so that the overlapped edge portions are brought into contact with each other. As the adhesive sets, these portions of course adhere firmly, and the blank thereby becomes a container in collapsed form. The edge portions are held together during setting of the adhesive, preferably under some pressure, as is common practice. It will be clear that although the method may be practiced with the blank stationary, it is ordinarily advantageous from the standpoint of speed and economy in production that the blank be glued while moving. Furthermore, gluing of the blank while it is moving permits the use of more efficient apparatus for carrying out the method than if the blank remains or halts in one spot. It is therefore preferred that the method be practiced on blanks moving continuously in a single direction.

Many changes may be made in the disclosed embodiment of the invention without departing from the inventive concept, and it is therefore to be understood that the above disclosure is illustrative and not restrictive, and that the invention is not intended to be limited otherwise than as required by the appended claims, with due regard to the spirit as well as the literal wording thereof.

I claim:

1. In a machine for applying glue to selected regions extending along the underneath axially extending edge region of the overlying overlapping portion of a resilient container blank folded to form a substantially flat collapsed tube having adjacent opposed upper and lower overlapping edge regions extending axially of the tube and in substantial but unsecured face-to-face contact, means providing a linear path of movement for the thus folded blank, means positioned along said path of movement establishing a gluing station, means for continuously advancing the folded blank axially along said path past said gluing station, an applicator roll at said gluing station for applying glue to said selected regions of the blank, means at said gluing station for guiding advancing increments of said upper overlapping region of the blank through the gluing station above said applicator roll and out of contact therewith, means for flexing the advancing blank to bias said advancing increments of the blank against said guiding means, means at said gluing station for guiding the advancing increments of said lower overlapping region of the blank past the gluing station below said applicator roll and out of contact therewith, pressing means at said gluing station movable between an inoperative position and an operative position wherein it engages the continuously moving blank and depresses the upper overlapping region and moves the same into adhesive-receiving engagement with the applicator roll against the action of said biasing means, means for actuating said pressing means, and means positioned in the path of movement of the blank for selectively controlling said actuating means in timed relation to the movement of the blank to press said selected regions against the applicator roll.

2. In a machine for applying glue to selected regions extending along the underneath axially extending edge region of the overlying overlapping portion of a resilient container blank folded to form a substantially flat collapsed tube having adjacent opposed upper and lower overlapping edge regions extending axially of the tube and in substantial but unsecured face-to-face contact, means providing a linear path of movement for the thus folded blank, means positioned along said path of movement establishing a gluing station, means for continuously advancing the folded blank axially along said path past said gluing station, an applicator roll at said gluing station for applying glue to said selected regions of the blank, means at said gluing station for guiding advancing increments of said upper overlapping region of the blank through the gluing station above said applicator roll and out of contact therewith, means for biasing the blank against said guiding means, means at said gluing station for guiding the advancing lower overlapping region of the blank past the gluing station below said applicator roll and out of contact therewith, pressing means at said gluing station movable between an inoperative position and an operative position wherein it engages the blank and depresses the upper overlapping region and moves the same into adhesive-receiving engagement with the applicator roll against the action of said biasing means, means for actuating said pressing means, means positioned along the path of movement of the blank and operable upon contact with the latter for rendering the actuating means effective to move the pressing means to its operative position, and additional means positioned along said path of movement and operable upon contact with the blank for rendering the actuating means ineffective.

3. In a machine for applying glue to selected regions extending along the underneath axially extending edge region of the overlying overlapping portion of a resilient container blank folded to form a substantially flat collapsed tube having adjacent opposed upper and lower overlapping edge regions extending axially of the tube in substantial but unsecured face-to-face contact, means providing a linear path of movement for the thus folded blank, means positioned along said path of movement establishing a gluing station, means for continuously advancing the folded blank axially along said path past said gluing station, an applicator roll at said gluing station for applying glue to said selected regions of the blank, means at said gluing station for guiding advancing increments of said upper overlapping region of the blank through the gluing station above said applicator roll and out of contact therewith, means for biasing the blank against said guiding means, means at said gluing station for guiding the advancing lower overlapping region of the blank past the gluing station below said applicator roll and out of contact therewith, pressing means at said gluing station movable between an inoperative position and an operative position wherein it engages the blank and depresses the upper overlapping region and moves the same into adhesive-receiving engagement with the applicator roll against the action of said biasing means, means for actuating said pressing means, a solenoid operable upon energization thereof to move said pressing means to its operative position, a normally deenergized circuit for said solenoid, and means operable under the control of movement of the blank along said path for effecting energization of said circuit.

4. In a machine for applying glue to a selected region extending along the underneath axially extending edge region of the overlying overlapping portion of a resilient container blank folded to form a substantially flat collapsed tube having adjacent opposed upper and lower overlapping edge regions extending axially of the tube and in substantial but unsecured face-to-face contact, means providing a path of travel for the blank, means positioned along said path establishing a gluing station, means for advancing the folded blank axially along said path past said gluing station, a relatively thin applicator roll at said gluing station for applying glue to said selected region of the blank, means at the gluing station for guiding advancing increments of said upper overlapping region of the blank through the gluing station above the applicator roll and out of contact therewith, means for biasing the blank against said guiding means, means for guiding the advancing lower overlapping region of the blank past the gluing station below said applicator roll and out of contact therewith, a presser roller at said gluing station movable between an elevated postion and a lowered position wherein it engages the blank and moves the same into adhesive-receiving engagement with the applicator roll against the action of said biasing means, and means for moving said presser roller.

5. In a machine for applying glue to a selected region extending along the underneath axially extending edge region of the overlying overlapping portion of a resilient container blank folded to form a substantially flat collapsed tube having adjacent opposed upper and lower overlapping edge regions extending axially of the tube and in substantial but unsecured face-to-face contact, means providing a path of travel for the blank, means positioned along said path establishing a gluing station, means for advancing the folded blank axially along said path past said gluing station, a relatively thin applicator roll at said gluing station for applying glue to said selected region of the blank, means at the gluing station for guiding advancing increments of said upper overlapping region of the blank through the gluing station above the applicator roll and out of contact therewith, means for biasing the blank against said guiding means, means for guiding the advancing lower overlapping region of the blank past the gluing station below said applicator roll and out of contact therewith, a presser roller at said gluing station movable between an elevated position and a lowered position wherein it engages the blank and moves the same into adhesive-receiving engagement with the applicator roll against the action of said biasing means, yieldable means normally urging said presser roller to its elevated position, a solenoid operable upon energization thereof to move the presser roller to its lowered position against the action of said yieldable means, a normally open circuit for the solenoid and relay means operable under the control of the movement of the blank along said path for closing said normally open circuit when said blank assumes a predetermined position relative to the gluing station.

6. In a machine for applying glue to a selected region extending along the underneath axially extending edge region of the overlying overlapping portion of a resilient container blank folded to form a substantially flat collapsed tube having adjacent opposed upper and lower overlapping edge regions extending axially of the tube and in substantial but unsecured face-to-face contact, means providing a path of travel for the blank, means positioned along said path establishing a gluing station, means for advancing the folded blank axially along said path past said gluing station, a relatively thin applicator roll at said gluing station for applying glue to said selected region of the blank, means at the gluing station for guiding advancing increments of said upper overlapping region of the blank through the gluing station above the applicator roll and out of contact therewith, means for biasing the blank against said guiding means, means for guiding the advancing lower overlapping region of the blank past the gluing station below said applicator roll and out of contact therewith, a presser roller at said gluing station movable between an elevated position and a lowered position wherein it engages the blank and moves the same into adhesive-receiving engagement with the applicator roll against the action of said biasing means, yieldable means normally urging said presser roller to its elevated position, a solenoid operable upon energization thereof to move the presser roller to its lowered position against the action of said yielding means, a circuit for said solenoid, a pair of normally open relay-operated contacts in said solenoid circuit, a coil operable upon energization thereof to close said contacts, a circuit for the coil, a pair of normally open container-actuated contacts in the coil circuit, and a finger positioned in the path of movement of the container and operable upon engagement with the latter for closing said container-actuated contacts.

7. In a machine for applying glue to a selected region extending along the underneath axially extending edge region of the overlying overlapping portion of a resilient container blank folded to form a substantially flat collapsed tube having adjacent opposed upper and lower overlapping edge regions extending axially of the tube and in substantial but unsecured face-to-face contact, means providing a path of travel for the blank, means positioned along said path establishing a gluing station, means for advancing the folded blank axially along said path past said gluing station, a relatively thin applicator roll at said gluing station for applying glue to said selected region of the blank, means at the gluing station for guiding advancing increments of said upper overlapping region of the blank through the gluing station above the applicator roll and out of contact therewith, means for biasing the blank against said guiding means, means for guiding the advancing lower overlapping region of the blank past the gluing station below said applicator roll and out of contact therewith, a presser roller at said gluing station movable between an elevated position and a lowered position wherein it engages the blank and moves the same into adhesive-receiving engagement with the applicator roll against the action of said biasing means, electromagnetic means operable when said container assumes a predetermined position relative to the applicator roll for moving said presser roller to its lowered position, and relay means operable when the container assumes a different predetermined position relative to the applicator roll for rendering said roll moving means inoperative.

8. In a machine for sealing a partially folded container blank including four wall panels hingedly connected together and arranged in alignment and in which the two outer panels have been folded inwardly and folded upon the adjacent two inner contiguous panels to bring the edges of the outer panels into slightly overlapping relation thus providing a substantially flat tubular blank structure, a table along which the blanks are adapted to be moved axially with the adjacent inner panels supported thereon, means for moving the blank along said table, a glue applicator roller positioned a slight distance above said table in the path of movement of the blank, means in advance of said glue applicator roller for engaging the panel having the uppermost overlapping edge and flexing the same to elevate said edge and cause the same to be moved over the applicator roller out of contact with the latter, means positioned in advance of said applicator roller for guiding the panel having the lowermost overlapping edge beneath said applicator roller and out of contact therewith, a presser member overlying said glue applicator and in close proximity thereto and above the path of movement of said uppermost overlapping edge, said presser member being movable from an elevated position wherein it is ineffective to flex the container to a lowered position wherein it engages the container and flexes the outer panel having the uppermost overlapping edge into engagement with the applicator roller along said latter edge to apply glue to the inner face thereof, means normally maintaining said presser member in its elevated position, a solenoid operable upon energization thereof to move said presser member to its lowered position, a normally open circuit for the solenoid, means operable in timed relation to movement of the blank along said table for closing said circuit at a predetermined time, and means engageable with said overlapping edges of the blank after the same have passed the glue applicator for pressing the same together in sealing relationship.

9. In a machine for sealing a partially folded container blank including four wall panels hingedly connected together and arranged in alignment and in which the two outer panels have been folded inwardly and folded upon the adjacent two inner contiguous panels to bring the edges of the outer panels into slightly overlapping relation thus providing a substantially flat tubular blank structure, means providing a path of movement for the blank axially through the machine, a glue applicator roller positioned in the path of movement of the blank, means including a pair of feed rolls for engaging the panel having the uppermost overlapping edge and progressively flexing the same to elevate said edge while at the same time impelling the panel forwardly along said path, means for guiding said elevated edge over the glue applicator roller out of contact therewith, means including a second pair of feed rolls for engaging the panel having the lowermost overlapping edge to impel the same forwardly, means for guiding said latter panel beneath said applicator roller and out of contact therewith, and selectively operable means positioned above said applicator roller for engaging the panel having the upper overlapping edge in the vicinity of said edge and depressing the edge into glue-receiving contact with the applicator roller.

RUDOLPH E. OHRN.

REFERENCES CITED

The following references are of record in the file of this patent:

UNITED STATES PATENTS

| Number | Name | Date |
|---|---|---|
| 649,392 | Barnes | May 8, 1900 |
| 857,678 | Schafer | June 25, 1907 |
| 1,067,867 | Dormandy | July 22, 1913 |
| 1,112,812 | Labombarde | Oct. 6, 1914 |
| 2,494,176 | Howard | Jan. 10, 1950 |
| 2,557,696 | Schaefer | June 19, 1951 |
| 2,571,204 | Conti | Oct. 16, 1951 |